United States Patent
Kusters et al.

(10) Patent No.: US 12,235,208 B2
(45) Date of Patent: Feb. 25, 2025

(54) ADJUSTMENT OF THE THICKNESS OF A BIOLOGICAL FLUID BEING MONITORED BY AN OPTICAL DETECTION ASSEMBLY

(71) Applicant: Fenwal, Inc., Lake Zurich, IL (US)

(72) Inventors: Benjamin E. Kusters, Pleasant Prairie, WI (US); Daniel R. Boggs, Libertyville, IL (US); James Madsen, Chicago, IL (US); Jeannette Wu, Naperville, IL (US); Matthew Fang, Deerfield, IL (US)

(73) Assignee: Fenwal, Inc., Lake Zurich, IL (US)

( * ) Notice: Subject to any disclaimer, the term of this patent is extended or adjusted under 35 U.S.C. 154(b) by 258 days.

(21) Appl. No.: 17/719,539

(22) Filed: Apr. 13, 2022

(65) Prior Publication Data
US 2022/0334049 A1    Oct. 20, 2022

Related U.S. Application Data
(60) Provisional application No. 63/175,146, filed on Apr. 15, 2021.

(51) Int. Cl.
| | | |
|---|---|---|
| G01N 21/05 | (2006.01) | |
| B01L 3/00 | (2006.01) | |
| G01N 21/03 | (2006.01) | |

(52) U.S. Cl.
CPC ........ G01N 21/05 (2013.01); B01L 3/502746 (2013.01); B01L 2300/0627 (2013.01);
(Continued)

(58) Field of Classification Search
CPC .. G01N 21/05; G01N 2021/036; G01N 21/85; G01N 2021/0364; G01N 2021/052;
(Continued)

(56) References Cited

U.S. PATENT DOCUMENTS

| | | |
|---|---|---|
| 5,316,667 A | 5/1994 | Brown et al. |
| 5,351,686 A | 10/1994 | Steuer et al. |

(Continued)

FOREIGN PATENT DOCUMENTS

| | | |
|---|---|---|
| EP | 0467804 B1 * | 7/1991 |
| EP | 1701149 A1 | 9/2006 |

(Continued)

OTHER PUBLICATIONS

Hou Xingwei et al. "Improving the nondestructive analysis accuracy of liquids in a flexible container based on the multi-pathlength spectrum method", Review Of Scientific Instruments, American Institute Of Physics, 2 Huntington Quadrangle, Melville, NY 11747, vol. 90, No. 5, May 1, 2019 (May 1, 2019), xp012237554.

(Continued)

*Primary Examiner* — Tarifur R Chowdhury
*Assistant Examiner* — Roberto Fabian, Jr.
(74) *Attorney, Agent, or Firm* — Cook Alex Ltd (57) ABSTRACT

An optical detection assembly for monitoring a biological fluid in a vessel includes two fluid-adjustment structures, which are spaced apart and configured to receive at least a portion of a biological fluid-containing vessel therebetween. A light source (which may be associated with one of the fluid-adjustment structures) is configured to emit light through a thickness of the biological fluid in the vessel, while a light detector (which may be associated with the other one of the fluid-adjustment structures) is configured to receive at least a portion of the light from the light source after it has passed through the biological fluid in the vessel. At least a portion of at least one of the fluid-adjustment structures is configured to move with respect to at least a portion of the other one so as to change the thickness of the biological fluid in the monitored portion of the vessel.

19 Claims, 5 Drawing Sheets

(52) U.S. Cl.
CPC . *B01L 2300/0832* (2013.01); *B01L 2400/082* (2013.01); *G01N 2021/036* (2013.01)

(58) Field of Classification Search
CPC .......... G01N 21/0303; B01L 3/502746; B01L 2300/0627; B01L 2300/0832; B01L 2400/082
See application file for complete search history.

(56) References Cited

U.S. PATENT DOCUMENTS

| | | | |
|---|---|---|---|
| 5,462,416 | A | 10/1995 | Dennehey et al. |
| 5,632,893 | A | 5/1997 | Brown et al. |
| 5,868,696 | A | 2/1999 | Giesler et al. |
| 5,980,760 | A | 11/1999 | Min et al. |
| 6,312,607 | B1 | 11/2001 | Brown et al. |
| 7,004,727 | B2 | 2/2006 | Kline et al. |
| 7,011,761 | B2 | 3/2006 | Muller |
| 7,297,272 | B2 | 11/2007 | Min et al. |
| 9,164,078 | B2 | 10/2015 | Min et al. |
| 9,562,858 | B2* | 2/2017 | Sano ................... G01N 33/49 |
| 9,638,608 | B2* | 5/2017 | Heintzelman, Jr. ... B01L 3/0275 |
| 9,833,557 | B2 | 12/2017 | Thill et al. |
| 9,895,482 | B2 | 2/2018 | Kusters et al. |
| 10,890,524 | B2 | 1/2021 | Kusters |
| 10,928,302 | B2* | 2/2021 | Esteban ............. G01N 21/4788 |
| 2003/0070969 | A1 | 4/2003 | Muller et al. |
| 2004/0241736 | A1* | 12/2004 | Hendee .............. A61B 5/14557 702/22 |
| 2005/0036147 | A1* | 2/2005 | Sterling ............... G01N 21/314 356/436 |
| 2006/0203237 | A1* | 9/2006 | Ji ....................... G01N 21/0303 356/246 |
| 2008/0020481 | A1 | 1/2008 | Yamamoto et al. |
| 2011/0076695 | A1 | 3/2011 | Ohshiro |
| 2013/0301901 | A1 | 11/2013 | Satish et al. |
| 2013/0324815 | A1 | 12/2013 | Jian et al. |
| 2014/0057771 | A1 | 2/2014 | Case et al. |
| 2014/0128838 | A1 | 5/2014 | Satish et al. |
| 2015/0219558 | A1 | 8/2015 | Koudelka et al. |
| 2015/0247791 | A1 | 9/2015 | Koerperick et al. |
| 2016/0366876 | A1 | 12/2016 | Min et al. |
| 2018/0188164 | A1 | 7/2018 | Xu et al. |
| 2019/0201916 | A1* | 7/2019 | Min ..................... A61M 1/3603 |
| 2021/0096128 | A1* | 4/2021 | Peyser .................... C07K 1/22 |

FOREIGN PATENT DOCUMENTS

| | | |
|---|---|---|
| EP | 2988113 A1 | 2/2016 |
| WO | WO 2016/004018 A1 | 1/2016 |
| WO | WO 2017/048673 A1 | 3/2017 |

OTHER PUBLICATIONS

Extended European Search Report for European Patent Application No. 22168055.6, dated Sep. 6, 2022.

* cited by examiner

ADJUSTMENT OF THE THICKNESS OF A BIOLOGICAL FLUID BEING MONITORED BY AN OPTICAL DETECTION ASSEMBLY

CROSS-REFERENCE TO RELATED APPLICATIONS

This application claims the benefit of and priority of U.S. Provisional Patent Application Ser. No. 63/175,146, filed Apr. 15, 2021, the contents of which are incorporated by reference herein.

BACKGROUND

Field of the Disclosure

The present disclosure relates to optical monitoring of biological fluids. More particularly, the present disclosure relates to adjustment of the thickness of a biological fluid being optically monitored.

Description of Related Art

It is known to employ an optical detection assembly to monitor the flow of blood, blood components, and other biological fluids through a fluid flow circuit to determine various characteristics of the flow. For example, U.S. Pat. No. 10,890,524 (which is hereby incorporated herein by reference) relates to optical detection assemblies for viewing into a centrifuge chamber and for monitoring fluid flowing through a conduit in fluid communication with the centrifuge chamber.

While U.S. Pat. No. 10,890,524 is specific to detection of red blood cells or free hemoglobin in separated plasma flowing out of a centrifuge chamber, it is well-known to optically monitor a biological fluid to determine any of a number of characteristics of the fluid. On account of the various characteristics of a biological fluid that may be of interest, different wavelengths of light (e.g., red, green, blue, or ultraviolet light) may be preferred for monitoring fluid in different procedures (in which different characteristics of the fluid are relevant). While this problem has been addressed by optical detection assemblies employing broadband light sources, it has also been found that the thickness of the fluid being monitored is relevant when determining the different characteristics of a biological fluid (e.g., detection of the presence of different particles or determination of cell concentrations). As used herein, the "thickness" of a fluid refers to the dimension of the monitored portion of fluid in a direction extending between a light source of the optical detection assembly and a light detector of the assembly for an optical detection assembly in which a biological fluid-containing vessel is positioned between the light source and light detector (i.e., the optical path or optical pathlength). Thus, the "thickness" of a fluid in a length of tubing having an inner diameter of 0.1" is 0.1" (because light from the light source on one side of the tubing must pass through 0.1" of the fluid in the tubing before reaching the light detector on the opposite side), while the "thickness" of a fluid in a monitored length of tubing having an inner diameter of 0.2" is 0.2".

For example, when monitoring whole blood to determine its red blood cell concentration or hematocrit, it may be advantageous to monitor a sample or amount of blood having a relatively small thickness or optical pathlength (e.g., on the order of 0.005") because the large number of red blood cells in a sample having an unduly large thickness or optical pathlength (e.g., blood flowing through a standard-size length of tubing) may inhibit successful light transmission measurement. On the other hand, when a particle of interest is present in a smaller concentration (e.g., when measuring the platelet concentration of platelet-rich plasma), a longer optical pathlength or greater fluid thickness (e.g., on the order of 0.1") may be advantageous; otherwise, if the fluid is not sufficiently thick, a detectable transmission measurement may not be achievable. Conventional devices employ optical detection assemblies and associated vessels presenting a fixed fluid thickness or optical pathlength, such that they may not be optimal for determination of all of the properties of interest of a biological fluid being optically monitored.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an optical detection assembly for monitoring a biological fluid in a vessel includes a first fluid-adjustment structure, a second fluid-adjustment structure, a light source, and a light detector. The first and second fluid-adjustment structures are spaced apart and configured to receive at least a portion of a biological fluid-containing vessel therebetween. The light source is configured to emit light through a thickness of the biological fluid in said at least a portion of the vessel, while the light detector is configured to receive at least a portion of the light emitted by the light source after said at least a portion of the light has passed through the biological fluid in said at least a portion of the vessel. At least a portion of at least one of the first and second fluid-adjustment mechanisms is configured to move with respect to at least a portion of the other one of the first and second fluid-adjustment structures so as to change the thickness of the biological fluid in said at least a portion of the vessel.

In another aspect, a system for monitoring a biological fluid includes a cassette and an optical detection assembly. The cassette has a body formed of a generally rigid material and defining an observation chamber including a flexible cover. The optical detection assembly includes a first fluid-adjustment structure, a second fluid-adjustment structure, a light source, and a light detector. The observation chamber is positioned between the first and second fluid-adjustment structures, with the light source being configured to emit light through a thickness of a biological fluid in the observation chamber, while the light detector is configured to receive at least a portion of the light emitted by the light source after the light has passed through the biological fluid in the observation chamber. At least a portion of one of the first and second fluid-adjustment structures is configured to move with respect to at least a portion of the other so as to contact and deform at least a portion of the flexible cover to change the thickness of the biological fluid in at least a portion of the observation chamber.

In yet another aspect, a system for monitoring a biological fluid includes a cuvette and an optical detection assembly. The cuvette has a body formed of a generally rigid material and defining an observation chamber including an open end.

The optical detection assembly includes a first fluid-adjustment structure, a second fluid-adjustment structure, a light source, and a light detector. The observation chamber is positioned between the first and second fluid-adjustment structures, with the light source being configured to emit light through a thickness of a biological fluid in the observation chamber, while the light detector is configured to receive at least a portion of the light emitted by the light source after the light has passed through the biological fluid in the observation chamber. At least a portion of one of the first and second fluid-adjustment structures is received by the open end of the observation chamber, defines a sliding seal with surfaces of the observation chamber, and is configured to move toward and away from the observation chamber so to change the thickness of the biological fluid in at least a portion of the observation chamber.

These and other aspects of the present subject matter are set forth in the following detailed description of the accompanying drawings.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

An optical detection assembly 10 embodying aspects of the present disclosure is shown in FIGS. 1-5. The optical detection assembly 10 is shown in isolation, but it should be understood that optical detection assemblies according to the present disclosure would typically be incorporated into a biological fluid processing system, such as one of the type described in U.S. Pat. No. 10,890,524, or any other system in which a biological fluid in a vessel is to be optically monitored. Additionally, while optical detection assemblies of the type described herein may be used to replace a conventional optical detection assembly, it should be understood that optical detection assemblies of the type described herein may provide the basis for new systems and optical monitoring applications that would not be possible with a conventional optical detection assembly.

The illustrated optical detection assembly 10 includes a first fluid-adjustment structure 12 (configured as a light source support) and a second fluid-adjustment structure 14 (configured as a light detector support). The light source support 12 includes an associated light source 16, while the light detector support 14 includes an associated light detector 18. The light source 16 and light detector 18 may be variously configured without departing from the scope of the present disclosure, provided that the light source 16 is configured to emit light through a vessel 20 positioned between the light source support 12 and the light detector support 14 and that the light detector 18 is configured to receive at least a portion of the light from the light source 16 that has passed through the vessel 20 and a biological fluid in the vessel 20. For example, in different embodiments, the light source 16 may be provided as a fiber optic light emitter configured to emit light having a single wavelength or light having a plurality of wavelengths (e.g., broadband light or white light), while the light detector 18 is provided as a fiber optic light detector that carries light to a photodiode, spectrometer, or other optical instrument capable of measuring light intensity. In an exemplary embodiment, a light-emitting fiber has a diameter of 100 μm, while a detecting fiber has a diameter of 1000 μm, with the detecting fiber being smaller than the emitting fiber in another embodiment, and with the two fibers being the same size in yet another embodiment.

In one embodiment, the light source 16 is removably associated with the light source support 12, while the light detector 18 is removably associated with the light detector support 14, such that one or both of the light source 16 and the light detector 18 may be removed for servicing or replacement (e.g., if a light source configured to emit light having a single wavelength is to be replaced by a light source configured to emit light having a different wavelength). Indeed, it should be understood that, while the structure identified in FIGS. 1-5 as 12 is referred to herein as the light source support, it is within the scope of the present disclosure for the light source to instead be associated with structure identified in FIGS. 1-5 as 14 (in which case that structure would serve as the light source support). Similarly, while the structure identified in FIGS. 1-5 as 14 is referred to herein as the light detector support, it is within the scope of the present disclosure for the light detector to instead be associated with the structure identified in FIGS. 1-5 as 12 (in which case that structure would serve as the light detector support).

The light source support 12 and the light detector support 14 are spaced apart so as to receive at least a portion of a biological fluid-containing vessel 20 therebetween. In the illustrated embodiment, the vessel 20 is configured as a length of tubing formed of a flexible material (e.g., plasticized polyvinyl chloride), but it should be understood that the vessel 20 may be otherwise configured (e.g., as a flexible or deformable bag or container) without departing from the scope of the present disclosure. The vessel 20 may be part of a fluid flow circuit, in which case the biological fluid may be flowing through the vessel 20 as it is being monitored, or may instead be a standalone structure, with the fluid being substantially stationary during monitoring. Typically, the vessel 20 is a disposable, single-use item that is separate from the durable optical detection assembly 10, but it is within the scope of the present disclosure for the vessel 20 to be durable or reusable or for the vessel 20 to be integrated into the optical detection assembly 10. Depending on the nature of the vessel 20, it may be advantageous to provide additional structures to support the vessel 20 (e.g., a hook from which to suspend a vessel 20 configured as a flexible bag) or otherwise ensure proper orientation of the vessel 20 with respect to the supports 12 and 14. For example, when the vessel 20 is especially deformable or flexible (such as when the vessel 20 is configured as a deformable or flexible bag), it may be advantageous to provide a vacuum source or the like to maintain contact between the supports 12 and 14 and appropriate surfaces of the vessel 20.

The particular configurations of the light source support 12 and the light detector support 14 may depend upon the configurations of the associated light source 16, light detector 18, and vessel 20, so it should be understood that the illustrated light source support 12 and light detector support 14 are merely exemplary. In the illustrated embodiment, the light detector support 14 is formed of a generally rigid material (e.g., a metallic or plastic material) or combination of materials and mounted to a base 22. The light detector support 14 includes a generally horizontal portion 24 serving as a platform or support for the vessel 20 and a generally vertical portion 26 to which the light detector 18 may be mounted or otherwise associated. The generally vertical portion 26 of the light detector support 14 includes a through-hole or opening or aperture extending generally horizontally therethrough (in a left-to-right direction in the orientation of FIGS. 1-5) and aligned with the light detector 18 so as to allow light from the light source 16 to pass through the light detector support 14 and be received by the light detector 18. In one embodiment, a portion of the light detector 18 may be mounted within the through-hole or opening or aperture defined in the generally vertical portion 26 of the light detector support 14, though it is within the scope of the present disclosure for the light detector 18 to be otherwise associated to the light detector support 14.

As for the light source support 12, it is formed of a generally rigid material (e.g., a metallic or plastic material) or combination of materials. The illustrated light source support 12 is seated on the generally horizontal portion 24 of the light detector support 14, with a vessel-contacting surface 28 of the light source support 12 facing a vessel-contacting surface 30 of the light detector support 14. Similar to the light detector support 14, a generally horizontally extending through-hole or aperture or opening is defined in the light source support 12 to allow for light from the light source 16 to pass through the light source support 12 and reach the vessel 20. In one embodiment, a portion of the light source 16 may be mounted within the through-hole or opening or aperture defined through the light source support 12, though it is within the scope of the present disclosure for the light source 16 to be otherwise associated to the light source support 12.

In the illustrated embodiment, the through-holes or apertures or openings of the light source support 12 and the light detector support 14 are substantially aligned or coaxial with each other and are oriented substantially transverse or perpendicular to the associated vessel-contacting surface 28, 30. Such a configuration may be advantageous to allow light from the light source 16 to pass through the light source support 12, through the vessel 20, and through the light detector support 14, where at least a portion of the light is received by the light detector 18. It should be understood that the through-holes or apertures or openings may be omitted, instead being replaced with an optically clear material to allow light to pass through the support 12, 14. This may include the entire support 12, 14 being formed of an optically clear material or only a portion of a support 12, 14 being formed of the optically clear material (e.g., only the portion corresponding to the locations of the through-holes or apertures or openings in the illustrated embodiments). Employing an optically clear material may be advantageous to the extent that it presents a smooth, uninterrupted vessel-contacting surface 28, 30.

The illustrated light source support 12 includes an arm 32, which may be either connected to or integrally formed with the remainder of the light source support 12. As with the remainder of the light source support 12, the arm 32 may be formed of a generally rigid material (e.g., a metallic or plastic material) or combination of materials. The arm 32 includes a generally horizontal portion 34 extending away from the light source support 12 and a generally vertical portion 36 extending downwardly (in the orientation of FIGS. 1-2 and 5). The generally vertical portion 36 of the arm 32 extends through a slot 38 defined in the base 22. The slot 38 is larger than the generally vertical portion 36 of the arm 32, which allows the arm 32 to be moved within the slot 38, as can be seen by comparing the positions of the arm 32 in FIGS. 1 and 2.

Figure 1:
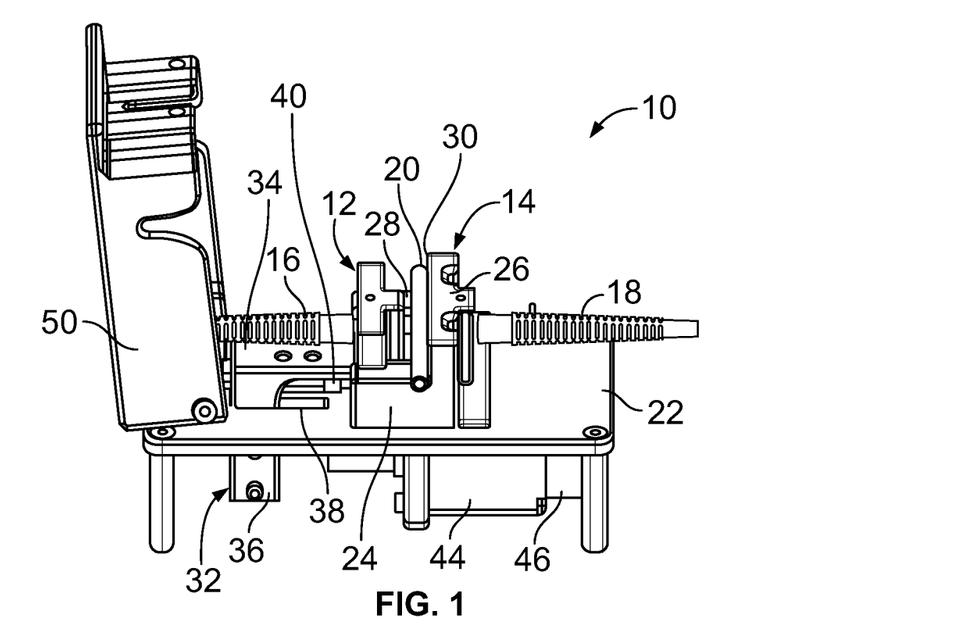
FIGS. 1 and 2 are perspective views of an optical detection assembly according to an aspect of the present disclosure.

The range of motion of the arm 32 (and, hence, the range of motion of the light source support 12) is limited by the length of the slot 38, with the left and right ends of the slot 38 defining the extreme positions into which the arm 32 may be moved. FIG. 1 shows the arm 32 in one of the extreme positions, with the arm 32 engaging the left end of the slot 38 and the arm 32 (and light source support 12) as far from the light detector support 14 (and vessel 20) as allowed by the slot 38. The position of the arm 32 and light source support 12 shown in FIG. 1 may serve as the initial or default position of the arm 32 and light source support 12, with the arm 32 and light source support 12 being so positioned at the beginning of a monitoring procedure and returned to the illustrated position after a monitoring procedure has been completed.

The arm 32 is not shown in the other extreme position, in which it is in contact with the right end of the slot 38 and positioned as close to the light detector support 14 as allowed by slot 38. The slot 38 may be configured such that the arm 32 (when moved from left to right in the illustrated orientation) comes into contact with the right end of the slot 38 before the light source support 12 comes into contact with the light detector support 14. Such a configuration may safeguard the light source support 12 from being brought too close to the light detector support 14, which could damage a vessel 20 positioned between the light source support 12 and the light detector support 14. In another embodiment, the slot 38 may instead be configured such that the arm 32 (when moved from left to right in the illustrated orientation) comes into contact with the right end of the slot 38 at the same time that the light source support 12 comes into contact with the light detector support 14. In yet another embodiment (in which the arm 32 is not free to move along the entire path defined by the slot 38), the light source support 12 may instead be configured to come into contact with the light detector support 14 before the generally vertical portion 36 of the arm 32 (when moving from left to right in the illustrated orientation) comes into contact with the right end of the slot 38.

Figure 2:
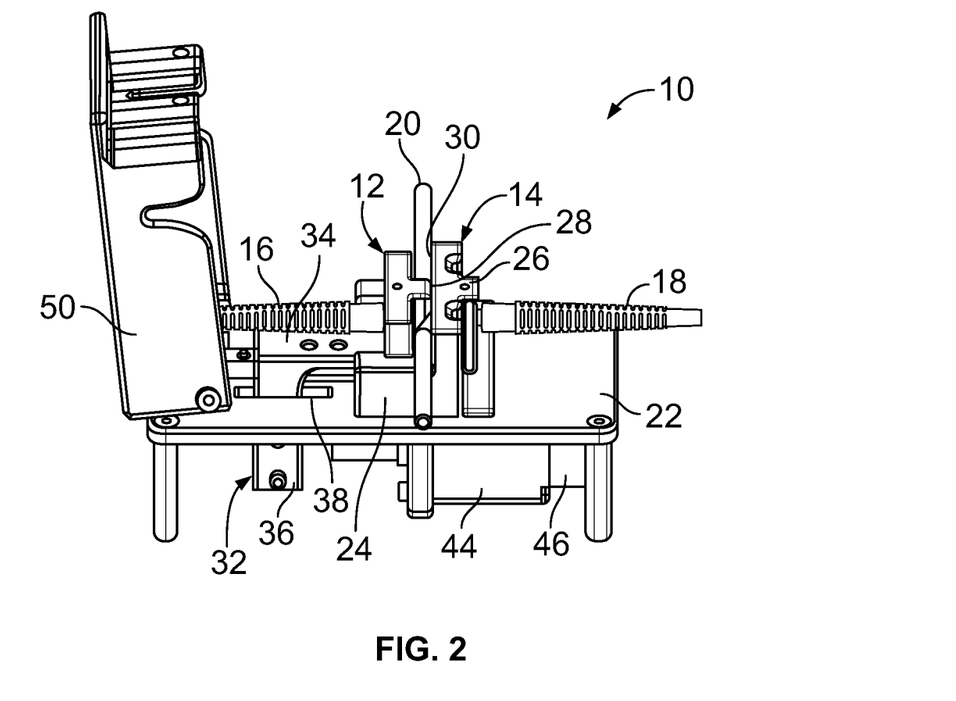
Figure 4:
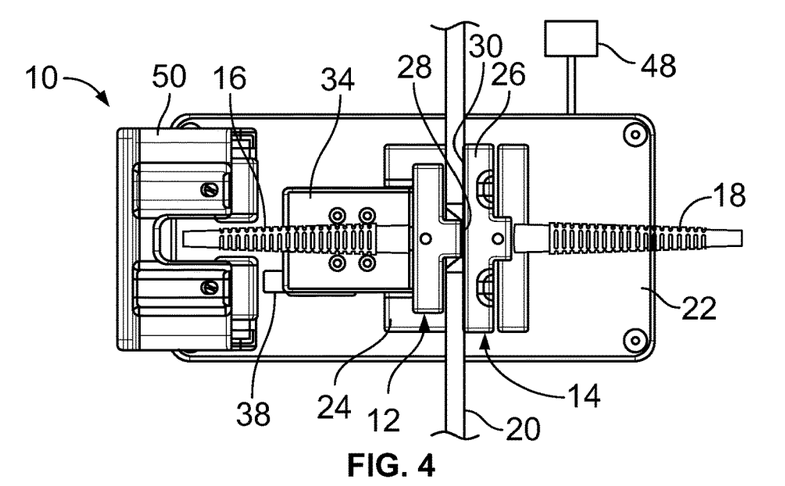

Regardless of the degree of motion of the arm 32 along the length of the slot 38 that is allowed, it may be advantageous for the width of the slot 38 (which dimension is best shown in FIG. 4) to be substantially equal to the width of the portion of the arm 32 received by the slot 38. By such a configuration, the arm 32 is constrained to purely linear movement through the slot 38, which restricts the light source support 12 to purely linear movement. As will be described in greater detail, the light source support 12 is configured to move into contact with a vessel 20 to compress a portion of the vessel 20 against the light detector support 14 (as shown in FIGS. 2 and 4), such that restricting the light source support 12 to movement in a purely linear direction better ensures that the vessel 20 is compressed at the proper location and to the proper degree. In the illustrated embodiment, a linear guide rail 40 (FIG. 1) is provided, with the arm 32 and light source support 12 being driven along the linear guide rail 40 to further enforce this purely linear movement of the arm 32 and light source support 12.

The generally vertical portion 36 of the arm 32 is shown as being coupled to a shaft 42 (FIG. 5) extending from a motor 44. The motor 44 is actuated to move the shaft 42 left and right (in the illustrated orientation), which correspondingly moves the arm 32 and the light source support 12. The motor 44 may be variously configured without departing from the scope of the present disclosure. In one embodiment, the motor 44 is configured as a stepper motor with an associated encoder 46, which provides feedback on the position of the motor, which may be used to determine the position of the arm 32 and light source support 12, which may be used to determine the degree of compression of the vessel 20 and the optical pathlength or thickness of the fluid in the portion of the vessel 20 being monitored.

It should be understood that the illustrated arm/shaft/motor assembly is merely exemplary and that other mechanisms may be provided for adjusting the position of the light source support 12 without departing from the scope of the present disclosure. For example, alternative mechanisms include (without limitation): pneumatic or hydraulic cylinders, a piezoelectric actuator, a cam actuator, a telescoping linear actuator, and a magnetic linear motor, with a possible preference of a drive mechanism that allows for tracking or determination of the position of the light source support 12. It is also contemplated that the light source support 12 may be manually moved, which may include a user turning a dial or knob to rotate a threaded shaft received by a threaded bore defined in the support 12, thereby moving the support 12 along the length of the shaft. Additionally, while FIGS. 1-5 illustrate an optical detection assembly in which only one of the supports is movable with respect to the other support, it should be understood that it is within the scope of the present disclosure for both supports to be movable, which could include two supports that are configured to move with respect to an associated vessel.

The motor 44 or other drive mechanism (and encoder 46, if provided) is electrically coupled to a controller 48 (FIGS. 3 and 4), which controls the operation of the motor 44 or drive mechanism. The controller 48 may be variously configured without departing from the scope of the present disclosure, provided that it is configured to coordinate the various tasks carried out by the components of the optical detection assembly 10 during a biological fluid monitoring procedure. In one embodiment, the controller 48 may include a microprocessor (which, in fact may include multiple physical and/or virtual processors). According to other embodiments, the controller 48 may include one or more electrical circuits designed to carry out the actions described herein. In fact, the controller 48 may include a microprocessor and other circuits or circuitry. In addition, the controller 48 may include one or more memories. The instructions by which the microprocessor is programmed may be stored on the memory associated with the microprocessor, which memory/memories may include one or more tangible non-transitory computer readable memories, having computer executable instructions stored thereon, which when executed by the microprocessor, may cause the microprocessor to carry out one or more actions as described herein. In one exemplary embodiment, the controller 48 comprises a main processing unit (MPU), which can comprise, e.g., a PENTIUM type microprocessor made by Intel Corporation, although other types of conventional microprocessors can be used.

If the optical detection assembly 10 is incorporated into a biological fluid processing system, the controller 48 may be mounted inside the system, such as adjacent to or incorporated into an operator interface station (e.g., a touchscreen). In other embodiments, the controller 48 and may be incorporated into the optical detection assembly 10 or may instead be incorporated into a separate device that is connected (either physically, by a cable or the like, or wirelessly) to the optical detection assembly 10 or to a biological fluid processing system incorporating the optical detection assembly 10.

Figure 3:
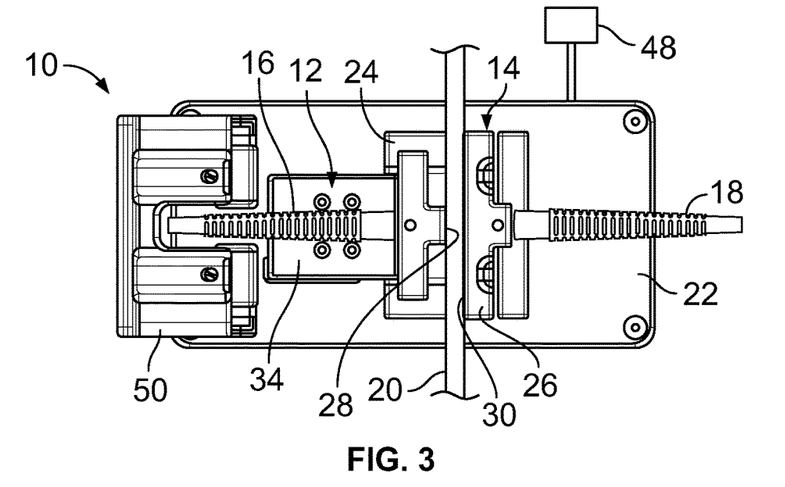
FIGS. 3 and 4 are top plan views of the optical detection assembly of FIGS. 1 and 2.

Regardless of its exact configuration, the controller 48 controls the motor 44 or other drive mechanism to move the light source support 12 to various positions, with FIGS. 1 and 3 showing a first position of the light source support 12 and FIGS. 2 and 4 showing a second position. It should be understood that the two illustrated positions are merely exemplary and that the light source support 12 may be moved into other positions (limited by the configuration of the slot 38, as described above) by the controller 48. The controller 48 may receive commands (e.g., from an operator or a system controller) to move the light source support 12 to a particular position or may be configured to determine the proper position for the light source support 12. For example, if an operator selects a fluid processing procedure in which the optical detection assembly 10 is used to monitor the hematocrit of a fluid flowing through the vessel 20, the controller 48 may respond to the selection of the procedure by determining the optimal position of the light source support 12 for monitoring hematocrit and proceed to commanding the motor 44 or other drive mechanism to move the light source support 12 to that position at the appropriate time.

The proper position of the light source support 12 may depend on a number of factors, such as the characteristic of interest of the fluid being monitored, the nature of the fluid being monitored, and the nature of the vessel 20. In one embodiment, the proper position of the light source support 12 in a number of scenarios may be experimentally determined, with the results being programmed into the controller 48 or otherwise being made available to the controller 48. Such a controller 48 may determine or be provided with the necessary factors (e.g., by the operator or a separate system controller) and then determine the proper position of the light source support 12 based on those factors.

In an exemplary embodiment, it may be enough for the controller 48 to be informed of the fluid processing procedure selected by the operator to determine the proper position of the light source support 12. The determination made by the controller 48 may be simplified by reducing the number of relevant factors, such as by restricting the optical detection assembly 10 to use with one type of vessel 20 (e.g., a flexible length of tubing having a particular inner and outer diameter) and one type of fluid (e.g., platelet-rich plasma separated from whole blood). On the other hand, it may be advantageous for the optical detection assembly 10 to be usable with a wider variety of vessels and fluids (for improved versatility and utility), with the controller 48 being programmed to take all of the relevant factors into account when determining the proper position of the light source support 2.

In any event, moving the light source support 12 from its first position (FIGS. 1 and 3) to or towards its second position (FIGS. 2 and 4) will cause a portion of the vessel 20 to be compressed or deformed between the vessel-contacting surface 28 of the light source support 12 and the vessel-contacting surface 30 of the light detector support 14, as best shown in FIG. 4. The distance between the surfaces 28 and 30 (or, in the illustrated embodiment, the position of the movable light source support 12) determines the optical pathlength or thickness of the fluid being monitored in the compressed portion of the vessel 20. Optionally, the controller 48 may be configured to control the optical detection assembly 10 to establish a range of possible thicknesses for the fluid, with there being any number of possible positions of the light source support 12 with respect to the light detector support 14, each compressing the vessel to a different degree and establishing a different fluid thickness or optical pathlength.

Compressing the vessel 20 between the two surfaces 28 and 30 makes the flow path through the compressed portion of the vessel 20 narrower (in a direction extending between the light source 16 and the light detector 18), thus decreasing the thickness of the fluid in that portion of the vessel 20. As explained above, decreasing the thickness of the fluid may be advantageous for certain fluids and/or for determining certain characteristics of a fluid. The optical detection assembly 10 may be controlled to compress the vessel 20 during the entirety of a fluid processing procedure or may instead be controlled to compress the vessel 20 only during a portion or portions of a procedure (e.g., only during a time or times when fluid in the compressed portion of the vessel 20 is to be monitored). If multiple measurements are taken during a procedure, one or more may be used to determine the fluid characteristic of interest. For example, the controller may be programmed to select one of the measurements over the others or to take an average of some or all of the different measurements.

It has been found that it may be advantageous to completely close or compress the vessel 20 (i.e., a fluid thickness or optical pathlength of zero) prior to establishing the desired fluid thickness or optical pathlength. After the vessel 20 has been completely closed or compressed (which may be detected by a sudden increase in the force required to compress the vessel or a rapid increase in motor current draw, for example), the surfaces 28 and 30 may be moved apart with respect to each other until the desired fluid thickness or optical pathlength is achieved. This may be advantageous (compared to moving the surfaces 28 and 30 directly to their final positions) in achieving an accurate fluid thickness on account of possible variations in vessel wall thickness, which may affect the proper positioning of the surfaces 28 and 30. Completely closing or compressing the vessel 20 before moving the surfaces 28 and 30 back to their proper positions eliminates vessel wall thickness as an unknown factor.

When the vessel 20 is not to be compressed (e.g., at the end of a procedure or during a procedure when the vessel 20 is not being monitored), the light source support 12 may be returned to its first position to restore normal flow through the vessel 20. While it may be advantageous in some settings to monitor flowing fluid (e.g., if a separated blood component is being monitored during apheresis), it is also within the scope of the present disclosure for stationary fluid to be monitored.

Figure 5:
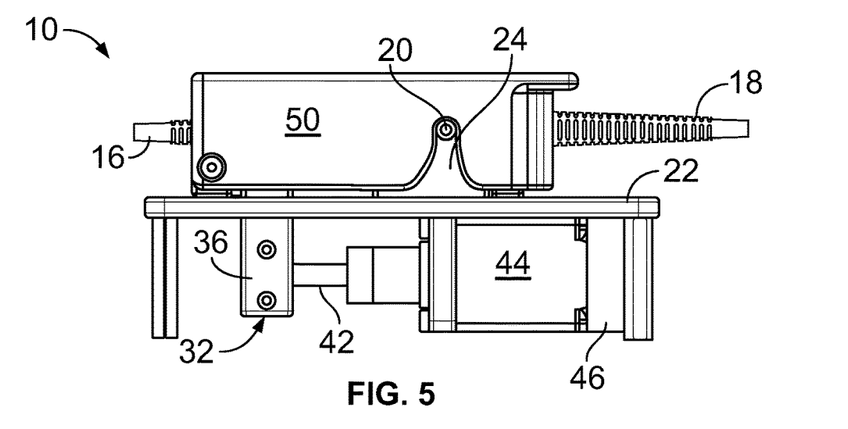
FIG. 5 is a side elevational view of the optical detection assembly of FIGS. 1 and 2, with a lid thereof in a second or closed orientation.

In the illustrated embodiment, a lid 50 is pivotally associated with the base 22. The lid 50 may be pivoted from a first position or orientation in which it is spaced from the compressed portion of the vessel 20 (shown in FIGS. 1-4) to a second position or orientation in which it overlays the compressed portion of the vessel 20, as shown in FIG. 5. The illustrated lid 50 is configured to engage and hold portions of the vessel 20 spaced away from the compressed portion of the vessel 20, which serves to restrict movement of the vessel 20 during movement of one or both of the supports 12 and 14. Additionally, once the supports 12 and 14 are both stationary and monitoring of the compressed portion of the vessel 20 begins, the lid 50 shields the light detector 18 from unwanted environmental light. It should be understood that pivotal movement is merely one possible approach for moving a lid between first and second orientations and that other approaches (e.g., configuring the lid to slide or otherwise translate between first and second orientations) may be employed without departing from the scope of the present disclosure.

Figure 6:
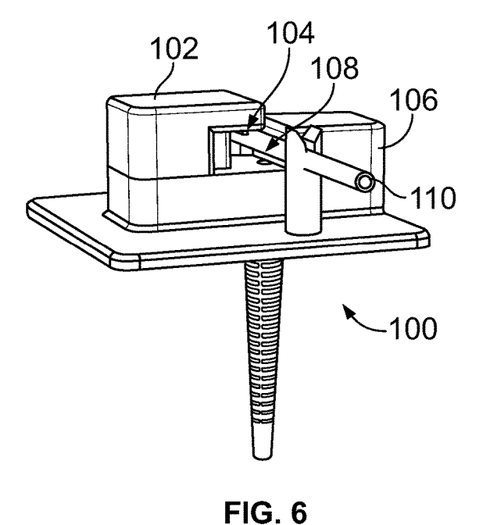
FIGS. 6-8 are perspective views of another embodiment of an optical detection assembly according to an aspect of the present disclosure.
Figure 7:
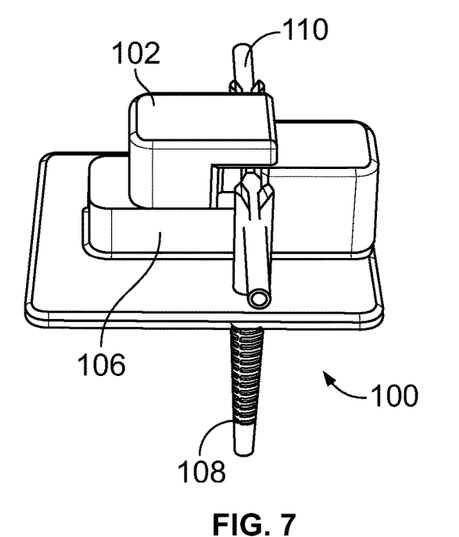
Figure 8:
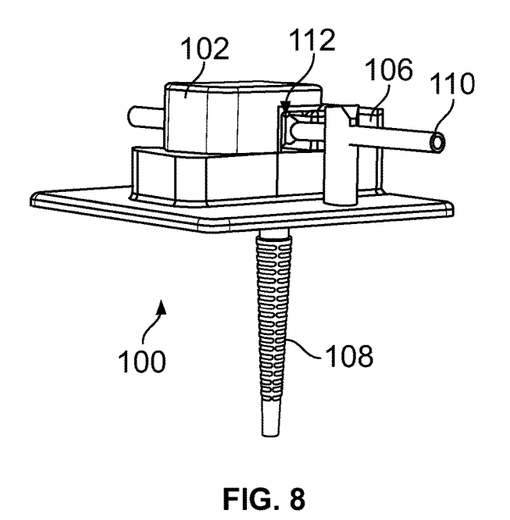

FIGS. 6-8 illustrate another exemplary optical detection assembly 100, which may be considered a variation of the optical detection assembly 10 of FIGS. 1-5. As in the embodiment of FIGS. 1-5, the optical detection assembly 100 of FIGS. 6-8 includes a first fluid-adjustment structure 102 (configured as a light source support) having an associated light source 104 and a second fluid-adjustment structure 106 (configured as a light detector support) having an associated light detector 108. One of the supports (which is illustrated as the light source support 102, but may instead be the light detector support 106) is configured to move with respect to the other support (or for both supports to be movable) to compress a vessel 110 positioned between the two supports 102 and 106. Although not illustrated, it should be understood that the mechanism for moving one or both of the supports may be similar to the one described above for the embodiment of FIG. 1-5 or may be a differently configured mechanism.

As in the embodiment of FIGS. 1-5, when a portion of the vessel 110 is compressed between the supports 102 and 106 (in a horizontal direction, in the orientation of FIGS. 6-8) it will deform, with the vessel 110 getting narrower in one direction (which is horizontal in the orientation of FIGS. 6-8) and wider in another direction (which is vertical in the orientation of FIGS. 6-8). While the optical detection assembly 10 of FIGS. 1-5 considers the fluid in the vessel 20 in the shortened (horizontal) direction, the optical detection assembly 100 of FIGS. 6-9 instead includes a light source 104 and light detector 108 configured and oriented to consider the fluid in the vessel 110 in the widened or elongated direction (which is vertical in the orientation of FIGS. 6-8). Indeed, rather than the light source 104 being configured to emit light in a direction that is substantially parallel to the direction in which one or both of the supports moves to compress the vessel 110 (as in the embodiment of FIGS. 1-5), the light source 104 is instead oriented to emit light in a direction (which is vertical in the orientation of FIGS. 6-8) that is substantially perpendicular to the direction of movement of the one or two supports (which is horizontal in the orientation of FIGS. 6-8), with the light detector 108 being configured and oriented to receive at least a portion of the light that has passed through the vessel 110 and fluid. The optical detection assembly 100 of FIGS. 6-9 may thus be considered to be particularly useful for analyzing fluids or fluid properties that benefit from a greater fluid thickness or optical pathlength (e.g., when a particle of interest is present in a small concentration in a fluid), whereas the optical detection assembly 10 of FIGS. 1-5 may be more advantageous for analyzing fluids or fluid properties that benefit from a smaller fluid thickness or optical pathlength (e.g., when a particle of interest is present in a greater concentration).

Figure 9:
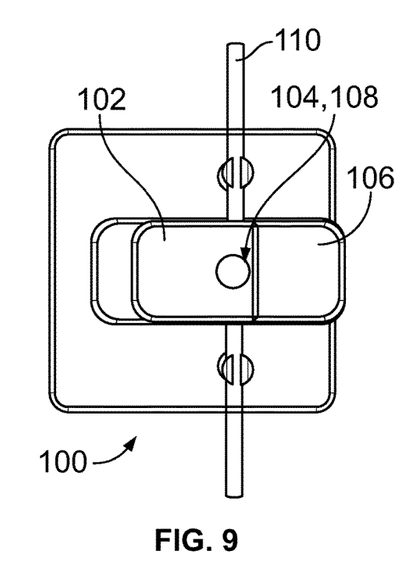
FIG. 9 is a top plan view of the optical detection assembly of FIGS. 6-8.

It will be seen that, when the light source support 102 is in its first position (FIG. 6), the light source 104 is out of alignment with the light detector 108. Movement of the light source support 102 from the first position to its second position (FIGS. 7-9) brings the light source 104 into alignment with the light detector 108 (as best shown in FIG. 9), ready to analyze fluid in the deformed portion 112 of the vessel 110 (FIG. 8). This is only the case when the light source 104 is fixedly associated to the light source support 102 and the light detector 108 is fixedly associated to the light detector support 106. In an alternative embodiment, the light source 104 may be movably or adjustably associated with the light source support 102 (e.g., by moving along a slot defined in the light source support 102) and/or the light detector 108 may be movably or adjustably associated to the light detector support 106 to allow the light detector 108 to remain in alignment with the light source 104 regardless of the relative positions of the supports 102 and 106.

Figure 13:
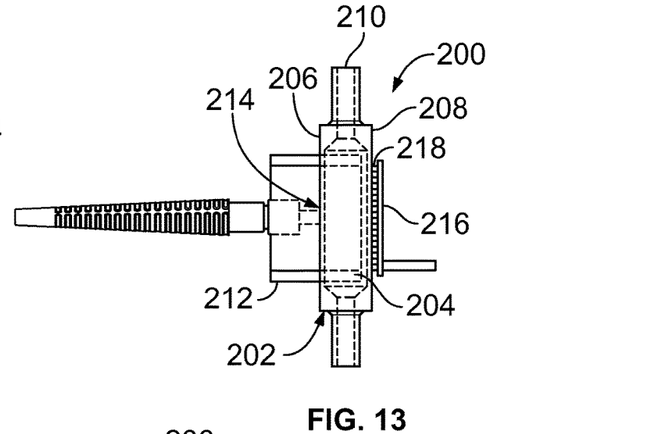
FIGS. 13 and 14 are side elevational views of a fourth embodiment of an optical detection assembly according to an aspect of the present disclosure.
Figure 14:
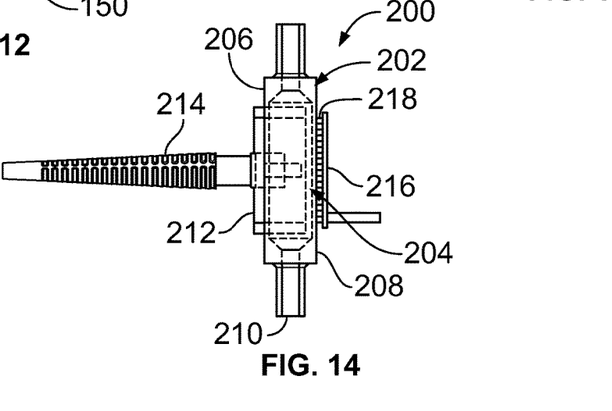

While the optical detection assemblies of FIGS. 1-9 are shown as being used in combination with a vessel configured as flexible tubing, it should be understood that the principles described herein may be applied to analyze fluid in other types of vessels. For example, FIGS. 10-12 illustrate an optical detection assembly 150 suitable for analyzing and changing the optical pathlength or thickness of a fluid in a vessel configured as a cassette 152, while FIGS. 13 and 14 illustrate an optical detection assembly 200 suitable for analyzing and changing the optical pathlength or thickness of a fluid in a vessel configured as a cuvette 202.

Figure 10:
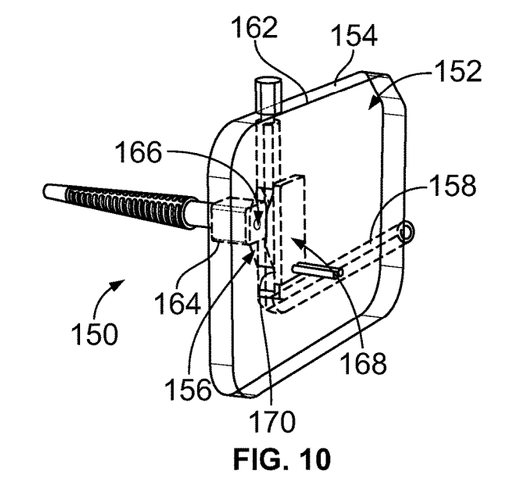
FIGS. 10-12 are perspective views of a third embodiment of an optical detection assembly according to an aspect of the present disclosure.
Figure 11:
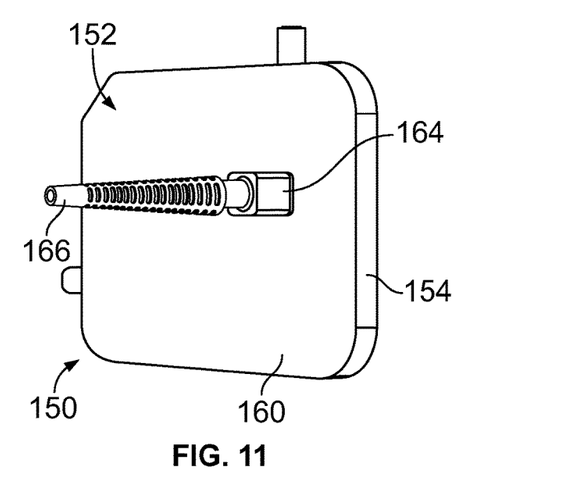
Figure 12:
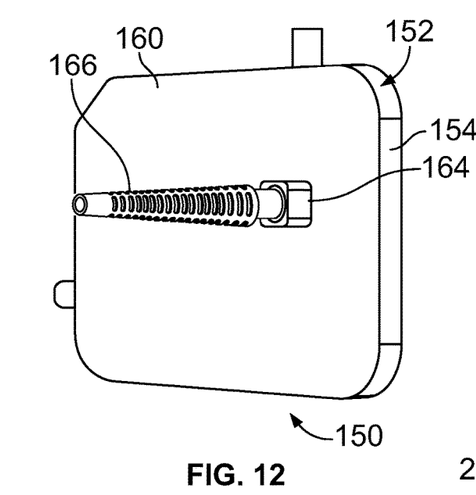

In the embodiment of FIGS. 10-12, the vessel is a cassette 152 that may be configured generally in accordance with the configuration described in U.S. Pat. No. 7,004,727 (which is hereby incorporated herein by reference). The cassette 152 has a body 154 formed of a generally rigid material. The body 154 defines a plurality of fluid flow paths through the cassette 152, along with any of a number of other possible structures (e.g., valves, pump chambers, sensing chambers, etc.). Among the structures defined by the body 154 of the cassette 152 is an observation chamber 156 (FIG. 10), which is fluidically connected to a flow path 158 through the cassette 152 to allow a fluid to be analyzed to flow into and then out of the observation chamber 156. The exact shape of the observation chamber 156 may vary without departing from the scope of the present disclosure, but in the illustrated embodiment, the observation chamber 156 is presented as an enlarged portion of the flow path 158, with a larger width than the width of the flow path 158 upstream and downstream of the observation chamber 156.

Opposing surfaces of the body 154 are provided with covers 160 and 162 that are sealed to the body 154 to cover the various structures and chambers defined by the body 154. At least the portion of the first cover 160 overlaying the observation chamber 156 is formed of a generally flexible or deformable material, though it may be advantageous for the entire cover 160 to be flexible. By such a configuration, the first cover 160 (which may be referred to as a diaphragm or membrane) may be manipulated by actuators that press the first cover 160 toward the body 154 of the cassette 152 to perform various functions (e.g., to close a valve or pump fluid through a flow path) or sensors that engage the flexible cover 160 to monitor fluid flow through the cassette 154. As for the second cover 162, it may also be formed of a flexible material or may alternatively be formed of a generally rigid material.

The optical detection assembly 150 includes a first fluid-adjustment structure 164 (configured as a light source support) having an associated light source 166 and a second fluid-adjustment structure 168 (configured as a light detector support) having an associated light detector 170. The light source 166 and light detector 170 may be configured as described above or may be differently configured, such as with the light detector 170 configured as an array of light detectors. Although not shown in FIGS. 10-12, the light source 166 and light detector 170 are electrically coupled to suitable power sources and/or controllers.

One of the supports is associated with the first cover 160 of the cassette 152, while the other support is associated with the second cover 162. In the illustrated embodiment, the light source support 164 is associated with the first cover 160, with the light detector support 168 being associated with the second cover 162, but it should be understood that the positions of the two may be reversed. Regardless of which support is associated with which cover, the light source support 164 and the light detector support 168 are aligned with each other, with at least a portion of the observation chamber 156 positioned therebetween. The light source 166 is associated with the light source support 164 and oriented so as to direct light emitted by the light source 166 through both covers 160 and 162, the observation chamber 156, and fluid in the observation chamber 156, with at least a portion of the light transmitted therethrough being received by the light detector 170. As light is to be transmitted through the covers 160 and 162, it is advantageous for them to be transparent or at least translucent and configured of a material that will not absorb any of the wavelengths of light to be used to analyze the fluid in the observation chamber 156.

Whichever support is associated with the first cover 160, that support is associated with a mechanism (e.g., a motor and associated assembly of the type described above or any other suitable drive mechanism) that is actuated under command of a controller to move the support toward and away from the other support, with the movable support contacting and deforming the first cover 160 when moved toward the other support. FIG. 11 shows the light source support 164 in a retracted or first position in which the first cover 160 is not deformed, with FIG. 12 showing the light source support 164 in an advanced or second position in which the first cover 160 is pressed into the observation chamber 156 by the light source support 164. As the light source support 164 (or the light detector support 168, if it is instead associated with the flexible first cover 160) is configured to move into the observation chamber 156, it is advantageous for the light source support 164 to have a perimeter or profile that is smaller than the perimeter or profile of the observation chamber 156. By such a configuration, movement of the light source support 164 toward the light detector support 168 will cause the light source support 164 to move into the observation chamber 156, rather than a wall of the observation chamber 156 engaging the light source support 164 and preventing such movement. In the illustrated embodiment, the light source support 164 has a generally square profile or perimeter configured to fit within the boundary defined by the observation chamber 156, but it should be clear that the light source support 164 (or the light detector support 168, if instead associated with the flexible first cover 160) may be differently configured without departing from the scope of the present disclosure, with the exact configuration being dependent upon the configuration of the observation chamber 156.

By advancing the light source support 164 toward the light detector support 168 and pressing the flexible first cover 160 into the observation chamber 156, the thickness of the fluid present in (and typically flowing through) the observation chamber 156 will be decreased, which is advantageous for monitoring certain fluids and for analyzing particular fluid characteristics (as described above). While this effect may be achieved by moving only one of the supports with respect to the cassette 152, it should be clear that the same effect may also be achieved by moving both supports toward the cassette 152 and into the observation chamber 156. In embodiments in which both supports are movable, both are associated with suitable drive mechanisms and controllers, with both of the covers 160 and 162 of the cassette 152 (or at least the portions of the covers overlaying the observation chamber 156) being formed of generally flexible materials.

Turning now to the optical detection assembly 200 of FIGS. 13 and 14, it may be considered to be a variation of the optical detection assembly 150 of FIGS. 10-12. In the system of FIGS. 13 and 14, the vessel is configured as a cuvette 202 formed of a generally rigid material to define an observation chamber 204 having an open end 206. The opposite end 208 of the observation chamber 204 is typically closed, though it is within the scope of the present disclosure for it to also be open. Similar to the observation chamber 156 of FIG. 10, the observation chamber 204 of FIGS. 13 and 14 is fluidically connected to a flow path 210 to allow a fluid to be analyzed to flow into and then out of the observation chamber 204. While it may be most typical for flowing fluid to be analyzed in the observation chamber 204, it is within the scope of the present disclosure for the fluid in the observation chamber 204 to be stationary while it is being analyzed by the optical detection assembly 200.

The optical detection assembly 200 includes a first fluid-adjustment structure 212 (configured as a light source support) having an associated light source 214 and a second fluid-adjustment structure 216 (configured as a light detector support) having an associated light detector 218. The light source 214 and light detector 218 may be configured as described above or may be differently configured, with FIGS. 13 and 14 showing a light source 214 and light detector 218 that are configured as in the embodiment of FIGS. 10-12, with the light detector 218 configured as an array of light detectors. Although not shown in FIGS. 13 and 14, the light source 214 and light detector 218 are electrically coupled to suitable power sources and/or controllers.

One of the supports is associated with the open end 206 of the observation chamber 204, while the other support is associated with the opposing end 208. In the illustrated embodiment, the light source support 212 is associated with the open end 206, with the light detector support 216 being associated with the opposing end 208, but it should be understood that the positions of the two may be reversed. Regardless of which support is associated with which end of the observation chamber 204, the light source support 212 and the light detector support 216 are aligned with each other, with at least a portion of the observation chamber 204 positioned therebetween. The light source 214 is associated with the light source support 212 and oriented so as to direct light emitted by the light source 214 through the observation chamber 204, a fluid in the observation chamber 204, and the opposing end 208 (if closed instead of open), with at least a portion of the light transmitted therethrough being received by the light detector 218. As light is to be transmitted through the opposing end 208 (if closed), it is advantageous for the cuvette 202 to be formed of a transparent or at least translucent material that will not absorb any of the wavelengths of light to be used to analyze the fluid in the observation chamber 204.

Whichever support is associated with the open end 206, that support is associated with a mechanism (e.g., a motor and associated assembly of the type described above or any other suitable drive mechanism) that is actuated under command of a controller to move the support toward and away from the other support, with the movable support forming a sliding seal with the observation chamber 204 to prevent leakage of fluid from the open end 206. FIG. 13 shows the light source support 212 in a retracted or first position in which the light source support 212 is received by the open end 206 of the observation chamber 204 without obstructing the flow of fluid through the observation chamber 204. FIG. 14 shows the light source support 212 in an advanced or second position in which it is pressed into the observation chamber 204. As the light source support 212 (or the light detector support 216, if it is instead associated with the open end 206) is configured to move into the observation chamber 204, it is advantageous for the light source support 212 to have a perimeter or profile that is smaller than the perimeter or profile of the observation chamber 204. By such a configuration, movement of the light source support 212 toward the light detector support 216 will cause the light source support 212 to move into the observation chamber 204, rather than a wall of the observation chamber 204 engaging the light source support 212 and preventing such movement. In the illustrated embodiment, the light source support 212 has a generally rectangular profile or perimeter configured to fit within the boundary defined by the observation chamber 204, but it should be clear that the light source support 212 (or the light detector support 216, if instead associated with the open end 206) may be differently configured without departing from the scope of the present disclosure, with the exact configuration being dependent upon the configuration of the observation chamber 204.

By advancing the light source support 212 toward the light detector support 216 and into the observation chamber 204, the thickness of the fluid present in (and typically flowing through) the observation chamber 204 will be decreased, which is advantageous for monitoring certain fluids and for analyzing particular fluid characteristics (as described above). While this effect may be achieved by moving only one of the supports with respect to the cuvette 202, it should be clear that the same effect may also be achieved by moving both supports toward the cuvette 202 and into the observation chamber 204. In embodiments in which both supports are movable, both are associated with suitable drive mechanisms and controllers, with both ends 206 and 208 of the observation chamber 204 being open. A sliding seal between a movable support and associated open end of the observation chamber 204 may be formed by any suitable means, which may include, for example, a gasket or wiper seal positioned between the perimeters of the support and associated open end of the observation chamber 204.

Figure 15:
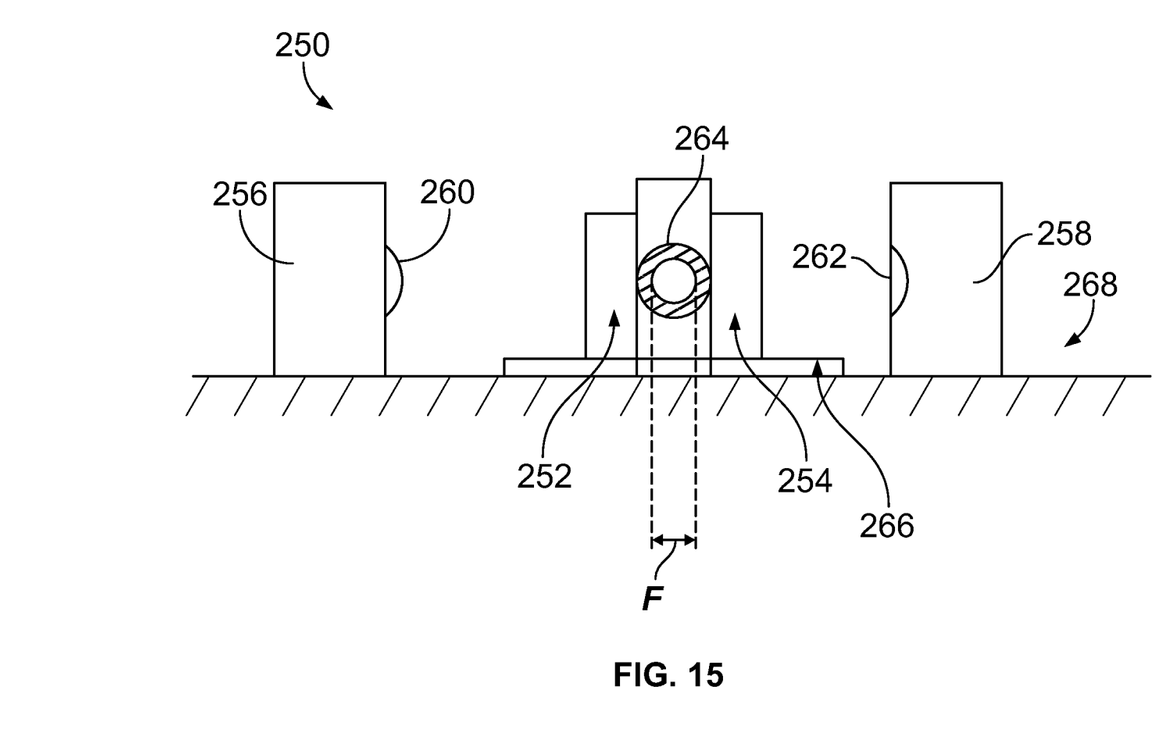
FIG. 15 is a side cross-sectional view of a fifth embodiment of an optical detection assembly according to an aspect of the present disclosure.

While the embodiments of FIGS. 1-14 illustrate fluid-adjustment structures having associated light sources and light detectors, it should be understood that the light source and/or light detector of an optical detection assembly according to the present disclosure may be provided separately of the fluid-adjustment structures. For example, FIG. 15 shows an optical detection assembly 250 similarly configured to the optical detection assembly 10 of FIGS. 1-5, but having differently configured first and second fluid-adjustment structures 252 and 254. In the embodiment of FIG. 15, separate light source and light detector supports 256 and 258 are provided, with the light source support 256 having an associated light source 260 (which may be configured as described above) and the light detector support 258 having an associated light detector 262 (which may be configured as described above).

In the embodiment of FIG. 15, at least a portion of one or both of the fluid-adjustment structures 252 and 254 is configured to move with respect to a portion of the other so as to change the thickness "F" of fluid in the vessel 264 positioned between the fluid-adjustment structures 252 and 254. The mechanism 266 employed to move one or both of the fluid-adjustment structures 252 and 254 may vary without departing from the scope of the present disclosure. In an exemplary embodiment, the mechanism 266 may be of the type described above with regard to the optical detection assembly 10 of FIGS. 1-5, with the vessel 264 (which is shown as a flexible tube) being compressed between the fluid-adjustment structures 252 and 254, which reduces the thickness F of the fluid being monitored by the optical detection assembly 250.

While FIG. 15 shows a vessel 264 configured as a flexible tube, it should be understood that a differently configured vessel may be provided, with the fluid-adjustment structures being reconfigured to accommodate the vessel, as necessary. In particular, it should be understood that any of the assemblies of FIGS. 1-14 may be reconfigured to employ fluid-adjustment structures that are separate from the light source and light detector of the assembly.

The light source support 256 and the light detector support 258 may be configured to be stationary or immobile with respect to a base 268 of the optical detection assembly 250. Alternatively, one or both of the light source support 256 and the light detector support 258 may be configured to move (e.g., under command of a controller) with respect to the base 268 (and, hence with respect to the vessel 264, the fluid-adjustment structures 252 and 254, and the other one of the light source support 256 and the light detector support 258). The desirability of moving the light source 260 with respect to the light detector 262 may depend on any of a number of factors. For example, as described above, the light detector 262 may be configured as an array of multiple sensors configured to receive scattered light, rather than being configured as a single sensor. When the light detector 262 is configured as an array of sensors, it may be advantageous for the positions of the light source 260 and the light detector 262 to remain fixed, as incident light intensity may depend on the distance from the light source 260 to the light detector 262. In other embodiments in which the distance between the light source 260 and the light detector 262 is less critical, one or both may be configured to move with an associated support structure. In general, it may be advantageous for a light source or light detector to remain stationary when it is desired to maintain a particular distance between the source/detector and a central axis of the fluid flow path (because the thickness of the fluid may be changed without changing the position of the central axis of the fluid flow path). On the other hand, it may be advantageous for a light source or light detector to be movable when it is desired to maintain a particular distance between the source/detector and an edge or wall of the vessel (because the position of the edge or wall may change when the thickness of the fluid is changed).

On account of optical detection assemblies of the present disclosure enabling dynamic change of the optical pathlength or thickness of a fluid being monitored, which is not possible using conventional assemblies, a number of new approaches for analyzing a fluid are now possible. For example, for a fluid characteristic of interest (e.g., hematocrit), a sample fluid having a known value may be analyzed at a plurality of different thicknesses or optical pathlengths. The transmission/absorbance measurements at the different fluid thicknesses or optical pathlengths may be used to create a curve that correlates the measurements to that known value at different fluid thicknesses or optical pathlengths. According to another example, fluids having different values for a characteristic of interest are analyzed at the same fluid thickness or optical pathlength, with transmission/absorbance measurements for the different fluids being used to create a curve that correlates the measurements for different fluid characteristic values at that fluid thickness or optical pathlength. In either case, a controller may be programmed to refer to the curve (e.g., the equation of the curve) when analyzing light that has passed through a fluid having a particular thickness or optical pathlength to determine the characteristic of interest for that fluid.

ASPECTS

Aspect 1. An optical detection assembly for monitoring a biological fluid in a vessel, comprising: a first fluid-adjustment structure; a second fluid-adjustment structure; a light source; and a light detector, wherein the first and second fluid-adjustment structures are spaced apart and configured to receive at least a portion of a biological fluid-containing vessel therebetween, the light source is configured to emit light through a thickness of the biological fluid in said at least a portion of the vessel, the light detector is configured to receive at least a portion of the light emitted by the light source after said at least a portion of the light has passed through the biological fluid in said at least a portion of the vessel, and at least a portion of at least one of the first and second fluid-adjustment structures is configured to move with respect to at least a portion of the other one of the first and second fluid-adjustment structures so as to change the thickness of the biological fluid in said at least a portion of the vessel.

Aspect 2. The optical detection assembly of Aspect 1, wherein the first and second fluid-adjustment structures are configured such that movement of said at least a portion of said at least one of the first and second fluid-adjustment structures with respect to the other one of the first and second fluid-adjustment structures changes a dimension of said at least a portion of the vessel.

Aspect 3. The optical detection assembly of any one of the preceding Aspects, further comprising a controller, and a motor coupled to the controller and to said at least a portion of said at least one of the first and second fluid-adjustment structures, wherein the motor is configured to be actuated to move said at least a portion of said at least one of the first and second fluid-adjustment structures with respect to said at least a portion of the other one of the first and second fluid-adjustment structures.

Aspect 4. The optical detection assembly of Aspect 3, wherein the controller is configured to actuate the motor to move said at least a portion of said at least one of the first and second fluid-adjustment structures with respect to said at least a portion of the other one of the first and second fluid-adjustment structures based at least in part on a characteristic of the biological fluid to be determined.

Aspect 5. The optical detection assembly of any one of the preceding Aspects, wherein the light source is configured as a broadband light source.

Aspect 6. The optical detection assembly of any one of Aspects 1-4, wherein the light source is configured to emit light having a single wavelength.

Aspect 7. The optical detection assembly of any one of the preceding Aspects, wherein said at least a portion of only one of the first and second fluid-adjustment structures is movable and said at least a portion of the other one of the first and second fluid-adjustment structures is stationary.

Aspect 8. The optical detection assembly of any one of the preceding Aspects, further comprising a lid configured to be moved from a first orientation in which the lid is spaced from said at least a portion of the vessel and a second orientation in which the lid overlays said at least a portion of the vessel.

Aspect 9. The optical detection assembly of Aspect 8, wherein the lid is configured to engage the vessel and restrict movement of the vessel when said at least a portion of said at least one of the first and second fluid-adjustment structures is moved with respect to said at least a portion of the other one of the first and second fluid-adjustment structures.

Aspect 10. The optical detection assembly of any one of the preceding Aspects, wherein the first and second fluid-adjustment structures are configured to accommodate a vessel configured as a flexible tube.

Aspect 11. The optical detection assembly of Aspect 10, wherein said at least a portion of said at least one of the first and second fluid-adjustment structures is configured to move in a direction substantially parallel to a direction in which light is emitted by the light source.

Aspect 12. The optical detection assembly of Aspect 11, configured such that relative movement of said at least a portion of said at least one of the first and second fluid-adjustment structures toward said at least a portion of the other one of the first and second fluid-adjustment structures decreases the thickness of the biological fluid.

Aspect 13. The optical detection assembly of Aspect 10, wherein said at least a portion of said at least one of the first and second fluid-adjustment structures is configured to move in a direction substantially perpendicular to a direction in which light is emitted by the light source.

Aspect 14. The optical detection assembly of Aspect 13, configured such that relative movement of said at least a portion of said at least one of the first and second fluid-adjustment structures toward said at least a portion of the other one of the first and second fluid-adjustment structures increases the thickness of the biological fluid.

Aspect 15. The optical detection assembly of any one of Aspects 1-7, wherein the first and second fluid-adjustment structures are configured to accommodate a vessel configured as a cassette having a body formed of a generally rigid material and defining an observation chamber including a flexible cover, the light source is configured and oriented to emit light through the observation chamber and the light detector is configured to receive at least a portion of the light emitted by the light source after said at least a portion of the light has passed through the biological fluid in the observation chamber, and said at least a portion of said at least one of the first and second fluid-adjustment structures is configured to contact and deform at least a portion of the flexible cover to change the thickness of the biological fluid in at least a portion of the observation chamber.

Aspect 16. The optical detection assembly of any one of Aspects 1-7, wherein the first and second fluid-adjustment structures are configured to accommodate a vessel configured as a cuvette having a body formed of a generally rigid material and defining an observation chamber including an open end, the light source is configured and oriented to emit light through the observation chamber and the light detector is configured to receive at least a portion of the light emitted by the light source after said at least a portion of the light has passed through the biological fluid in the observation chamber, at least a portion of one of the first and second fluid-adjustment structures is configured to be received by the open end of the observation chamber and define a sliding seal with surfaces of the observation chamber, and said at least a portion of said one of the first and second fluid-adjustment structures is configured to move toward and away from the observation chamber so as to change the thickness of the biological fluid in at least a portion of the observation chamber.

Aspect 17. The optical detection assembly of any one of Aspects 15-16, wherein the light detector is configured as an array of light detectors.

Aspect 18. The optical detection assembly of any one of the preceding Aspects, wherein the light source is associated to the first fluid-adjustment structure and the light detector is associated to the second fluid-adjustment structure such that movement of said at least a portion of said at least one of the first and second fluid-adjustment structures with respect to said at least a portion of the other one of the first and second fluid-adjustment structures changes a distance between the light source and the light detector.

Aspect 19. The optical detection assembly of any one of Aspects 1-17, wherein a distance between the light source and the light detector is configured to remain unchanged upon movement of said at least a portion of said at least one of the first and second fluid-adjustment structures with respect to said at least a portion of the other one of the first and second fluid-adjustment structures.

Aspect 20. A system for monitoring a biological fluid, comprising: a cassette comprising a body formed of a generally rigid material and defining an observation chamber including a flexible cover; and an optical detection assembly comprising a first fluid-adjustment structure, a second fluid-adjustment structure, a light source, and a light detector, wherein the observation chamber is positioned between the first and second fluid-adjustment structures, the light source is configured to emit light through a thickness of a biological fluid in the observation chamber, the light detector is configured to receive at least a portion of the light emitted by the light source after said at least a portion of the light has passed through the biological fluid in the observation chamber, and at least a portion of one of the first and second fluid-adjustment structures is configured to move with respect to at least a portion of the other one of the first and second fluid-adjustment structures so as to contact and deform at least a portion of the flexible cover to change the thickness of the biological fluid in at least a portion of the observation chamber.

Aspect 21. A system for monitoring a biological fluid, comprising: a cuvette comprising a body formed of a generally rigid material and defining an observation chamber including an open end; and an optical detection assembly comprising a first fluid-adjustment structure, a second fluid-adjustment structure, a light source, and a light detector, wherein the observation chamber is positioned between the first and second fluid-adjustment structures, the light source is configured to emit light through a thickness of a biological fluid in the observation chamber, the light detector is configured to receive at least a portion of the light emitted by the light source after said at least a portion of the light has passed through the biological fluid in the observation chamber, and at least a portion of one of the first and second fluid-adjustment structures is received by the open end of the observation chamber, defines a sliding seal with surfaces of the observation chamber, and is configured to move toward and away from the observation chamber so to change the thickness of the biological fluid in at least a portion of the observation chamber.

It will be understood that the embodiments and examples described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An optical detection assembly for monitoring a biological fluid in a vessel, comprising:
   a first fluid-adjustment structure;
   a second fluid-adjustment structure;
   a light source;
   a light detector;
   a controller; and
   a drive mechanism coupled to the controller, wherein
      the first and second fluid-adjustment structures are spaced apart and configured to receive at least a portion of a biological fluid-containing vessel therebetween,
      the light source is configured to emit light through a thickness of the biological fluid in said at least a portion of the vessel,
      the light detector is configured to receive at least a portion of the light emitted by the light source after said at least a portion of the light has passed through the biological fluid in said at least a portion of the vessel, and
      the controller is configured to first actuate the drive mechanism to cause at least a portion of at least one of the first and second fluid-adjustment structures to move with respect to at least a portion of the other one of the first and second fluid-adjustment structures so as to compress said at least a portion of the vessel and decrease the thickness of the biological fluid in said at least a portion of the vessel to zero and to subsequently actuate the drive mechanism to cause said at least a portion of said at least one of the first and second fluid-adjustment structures to move with respect to said at least a portion of the other one of the first and second fluid-adjustment structures so as to increase the thickness of the biological fluid in said at least a portion of the vessel from zero to a target thickness.

2. The optical detection assembly of claim 1, wherein the drive mechanism includes a motor.

3. The optical detection assembly of claim 2, wherein the controller is configured to actuate the motor to move said at least a portion of said at least one of the first and second fluid-adjustment structures with respect to said at least a portion of the other one of the first and second fluid-adjustment structures based at least in part on a characteristic of the biological fluid to be determined.

4. The optical detection assembly of claim 1, wherein the light source is configured as a broadband light source.

5. The optical detection assembly of claim 1, wherein the light source is configured to emit light having a single wavelength.

6. The optical detection assembly of claim 1, wherein said at least a portion of only one of the first and second fluid-adjustment structures is movable and said at least a portion of the other one of the first and second fluid-adjustment structures is stationary.

7. The optical detection assembly of claim 1, further comprising a lid configured to be moved from a first orientation in which the lid is spaced from said at least a portion of the vessel and a second orientation in which the lid overlays said at least a portion of the vessel.

8. The optical detection assembly of claim 7, wherein the lid is configured to engage the vessel and restrict movement of the vessel when said at least a portion of said at least one of the first and second fluid-adjustment structures is moved with respect to said at least a portion of the other one of the first and second fluid-adjustment structures.

9. The optical detection assembly of claim 1, wherein the first and second fluid-adjustment structures are configured to accommodate a vessel configured as a flexible tube.

10. The optical detection assembly of claim 9, wherein said at least a portion of said at least one of the first and second fluid-adjustment structures is configured to move in a direction substantially parallel to a direction in which light is emitted by the light source.

11. The optical detection assembly of claim 10, configured such that relative movement of said at least a portion of said at least one of the first and second fluid-adjustment structures toward said at least a portion of the other one of the first and second fluid-adjustment structures decreases the thickness of the biological fluid.

12. The optical detection assembly of claim 1, wherein
   the first and second fluid-adjustment structures are configured to accommodate a vessel configured as a cassette having a body formed of a generally rigid material and defining an observation chamber including a flexible cover,
   the light source is configured and oriented to emit light through the observation chamber and the light detector is configured to receive at least a portion of the light emitted by the light source after said at least a portion of the light has passed through the biological fluid in the observation chamber, and
   said at least a portion of said at least one of the first and second fluid-adjustment structures is configured to contact and deform at least a portion of the flexible cover to change the thickness of the biological fluid in at least a portion of the observation chamber.

13. The optical detection assembly of claim 1, wherein
   the first and second fluid-adjustment structures are configured to accommodate a vessel configured as a cuvette having a body formed of a generally rigid material and defining an observation chamber including an open end,
   the light source is configured and oriented to emit light through the observation chamber and the light detector is configured to receive at least a portion of the light emitted by the light source after said at least a portion of the light has passed through the biological fluid in the observation chamber,
   at least a portion of one of the first and second fluid-adjustment structures is configured to be received by the open end of the observation chamber and define a sliding seal with surfaces of the observation chamber, and said at least a portion of said one of the first and second fluid-adjustment structures is configured to move toward and away from the observation chamber so as to change the thickness of the biological fluid in at least a portion of the observation chamber.

14. The optical detection assembly of claim 12, wherein the light detector is configured as an array of light detectors.

15. The optical detection assembly of claim 1, wherein the light source is associated to the first fluid-adjustment structure and the light detector is associated to the second fluid-adjustment structure such that movement of said at least a portion of said at least one of the first and second fluid-adjustment structures with respect to said at least a portion of the other one of the first and second fluid-adjustment structures changes a distance between the light source and the light detector.

16. The optical detection assembly of claim 1, wherein a distance between the light source and the light detector is configured to remain unchanged upon movement of said at least a portion of said at least one of the first and second fluid-adjustment structures with respect to said at least a portion of the other one of the first and second fluid-adjustment structures.

17. A system for monitoring a biological fluid, comprising:
a cassette comprising a body formed of a generally rigid material and defining an observation chamber including a flexible cover; and
an optical detection assembly comprising
a first fluid-adjustment structure,
a second fluid-adjustment structure,
a light source,
a light detector,
a controller, and
a drive mechanism coupled to the controller, wherein
the observation chamber is positioned between the first and second fluid-adjustment structures,
the light source is configured to emit light through a thickness of a biological fluid in the observation chamber,
the light detector is configured to receive at least a portion of the light emitted by the light source after said at least a portion of the light has passed through the biological fluid in the observation chamber, and
the controller is configured to first actuate the drive mechanism to cause at least a portion of one of the first and second fluid-adjustment structures to move with respect to at least a portion of the other one of the first and second fluid-adjustment structures so as to contact and deform at least a portion of the flexible cover to decrease the thickness of the biological fluid in at least a portion of the observation chamber to zero and to subsequently actuate the drive mechanism to cause said at least a portion of said at least one of the first and second fluid-adjustment structures to move with respect to said at least a portion of the other one of the first and second fluid-adjustment structures so as to increase the thickness of the biological fluid in said at least a portion of the observation chamber from zero to a target thickness.

18. A system for monitoring a biological fluid, comprising:
a cuvette comprising a body formed of a generally rigid material and defining an observation chamber including a first open end and a second open end; and
an optical detection assembly comprising
a first fluid-adjustment structure,
a second fluid-adjustment structure,
a light source, and
a light detector, wherein
the observation chamber is positioned between the first and second fluid-adjustment structures,
the light source is configured to emit light through a thickness of a biological fluid in the observation chamber,
the light detector is configured to receive at least a portion of the light emitted by the light source after said at least a portion of the light has passed through the biological fluid in the observation chamber,
at least a portion of one of the first fluid-adjustment structure is received by the first open end of the observation chamber, defines a sliding seal with surfaces of the observation chamber, and is configured to move toward and away from the observation chamber so to change the thickness of the biological fluid in at least a portion of the observation chamber, and
at least a portion of the second fluid-adjustment structure is received by the second open end of the observation chamber, defines a sliding seal with surfaces of the observation chamber, and is configured to move toward and away from the observation chamber so as to change the thickness of the biological fluid in said at least a portion of the observation chamber.

19. The system of claim 18, wherein the light detector is configured as an array of light detectors.

* * * * *